(12) United States Patent
Cheiky et al.

(10) Patent No.: US 6,884,542 B1
(45) Date of Patent: Apr. 26, 2005

(54) METHOD FOR TREATING TITANIUM TO ELECTROPLATING

(75) Inventors: Michael Cheiky, Santa Barbara, CA (US); Jan Lofvander, Santa Barbara, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 201 days.

(21) Appl. No.: 10/144,343

(22) Filed: May 13, 2002

(51) Int. Cl.$^7$ ............................................... H01M 2/02
(52) U.S. Cl. ...................................................... 429/176
(58) Field of Search ................................ 429/176, 219, 429/168, 169, 170; 205/263, 212; 148/243, 269, 272

(56) References Cited

U.S. PATENT DOCUMENTS

| | | | | |
|---|---|---|---|---|
| 2,734,837 A | * | 2/1956 | Hands | .......................... 134/27 |
| 3,440,100 A | * | 4/1969 | Gumucio et al. | ........... 429/163 |
| 4,037,032 A | * | 7/1977 | Nidola et al. | ................ 429/199 |
| 4,394,224 A | * | 7/1983 | Mahoon et al. | ............. 205/322 |
| 4,416,739 A | | 11/1983 | Turner | |
| 5,074,972 A | * | 12/1991 | Matz | .......................... 205/322 |

FOREIGN PATENT DOCUMENTS

JP  2000271493 A  * 10/2000  ............ B01J/37/12

OTHER PUBLICATIONS

Blair, Alan, "Silver Plating", vol. 5, Surface Engineering, ASM Handbook, ASM International, 1996.*

* cited by examiner

Primary Examiner—Roy King
Assistant Examiner—Harry D. Wilkins, III
(74) Attorney, Agent, or Firm—Marvin E. Jacobs

(57) ABSTRACT

A container method for pre-treating the inside surface of a titanium container before electroplating a metal conductive such as silver to increase adhesion for use in a lightweight alkaline battery comprising the step of applying an alkaline solution of peroxide to the surface.

3 Claims, 1 Drawing Sheet

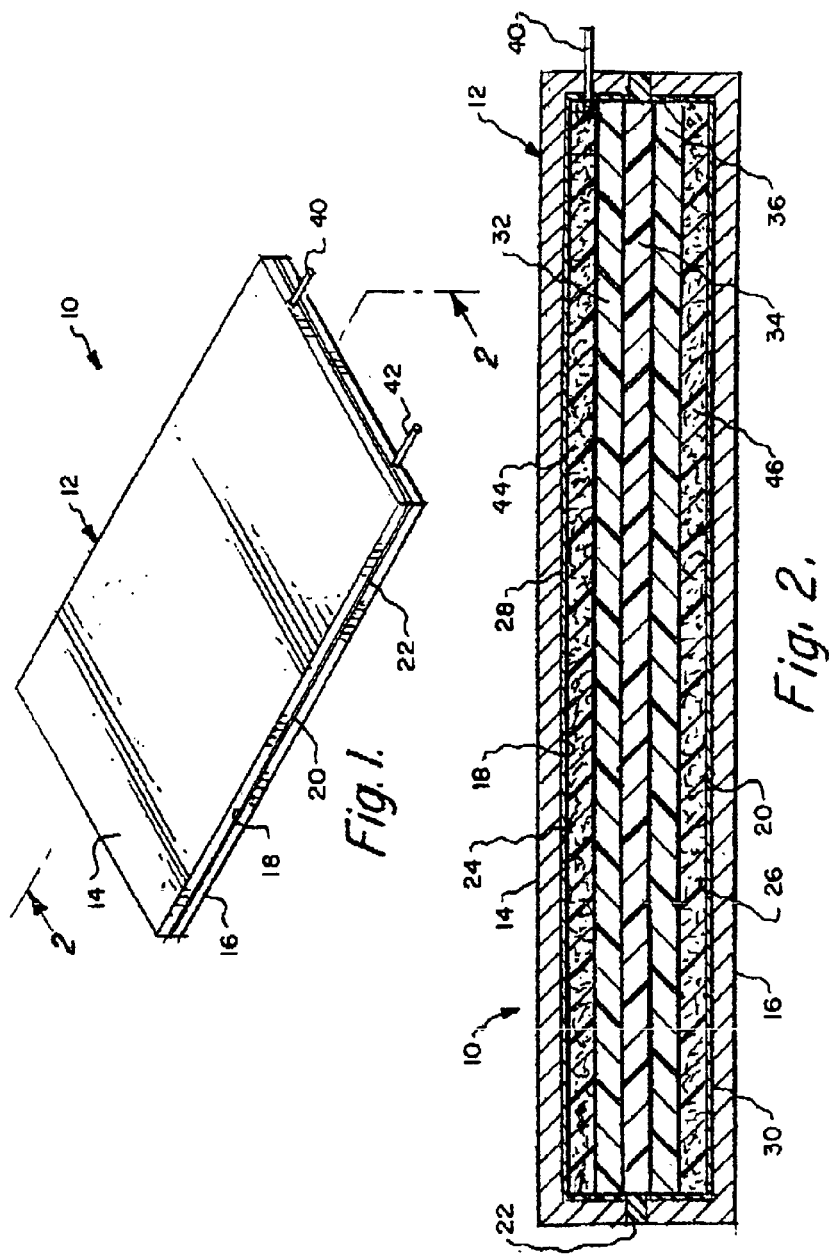

METHOD FOR TREATING TITANIUM TO ELECTROPLATING

TECHNICAL FIELD

A method is disclosed for treating titanium in order to improve the adherence of a metal subsequently applied by electroplating.

BACKGROUND OF THE INVENTION

Titanium is a readily available metal that finds use in a wide variety of applications, in particular as the structural material in aircrafts, engines, missiles, and bicycles. It is also used in chemical equipment, as X-ray tube targets, and as a material in metal-ceramic brazing. It is economical and relatively light. It is desirable in certain applications to electroplate the surface of titanium with a metal having certain desired properties. For example, it might be desirable to plate titanium with silver because the silver surface would convey electrical conductivity to the surface, since titanium is a relatively poor electrical conductor by comparison.

STATEMENT OF THE PRIOR ART

Titanium is a notoriously difficult material to electroplate. Conventional pretreatment methods are primarily acid based. "Modern Electroplating" by Frederick Lowenheim (3$^{rd}$ edition, John Wiley & Sons) describes five general procedures for activating the titanium surface. These methods include etching with glycol-fluoride solutions, etching in chromic-hydrofluoric acid solutions, electrolytic activation in acetic-hydrofluoric acid solutions, etching in hot hydrochloric acid solutions and surface blasting accompanied by heat bonding of the plated coating. Silver in particular has been plated on vapor-blasted titanium followed by vacuum or argon heat treatment at 190–450 degrees Celsius for one hour. Another method calls for using an alkaline silver cyanide bath at room temperature using a vapor-blasted titanium cathode. These methods have the effect of removing the substrate oxide layer as well as roughening the surface in order to improve adhesion between the surface and the electroplated metal. Abrasive blasting, however, can lead to undesirable metallurgical changes in the substrate.

In U.S. Pat. No. 4,416,739, Turner exposes the titanium surface to be electroplated to an aqueous solution of hydrofluoric acid and formamides until a gray deposit appears. In practice, it has been observed that plating on titanium surfaces pretreated by acid-based activation methods do not yield robust adhesion.

STATEMENT OF THE INVENTION

This invention discloses an alkaline-based activation method which yields superior adhesion. The activated titanium surface can be coated with a conductive metal such as silver which can be used to form a lightweight battery in which the titanium does double duty as electrode substrate and battery case thereby removing the need for metal screens or sheets as electrode substrates.

BRIEF DESCRIPTION OF DRAWINGS

FIG. 1 is a schematic drawing showing a battery with a silver plated titanium substrate and FIG. 2 is a cross-section taken along 2—2 of FIG. 1.

DETAILED DESCRIPTION OF THE INVENTION

The present invention provides an alkaline-based method of activating a titanium or a titanium base alloy surface prior to electroplating. The following ranges have been found to afford an active titanium surface with good adhesion of silver:

| General | Subgeneral | Preferred | Range |
|---|---|---|---|
| Alkaline Material | Group IA or NH$_4$ hydroxide | KOH NaOH | 2–8 g/l |
| Peroxide | Hydrogen or Group IA peroxide | H$_2$O$_2$ | 10–20 g/l |

The above two substances are mixed at room temperature and the titanium is quickly placed in the mixed solution. Etching is performed for approximately one hour.

Example
SURFACE ACTIVATION
85 g water
5.5 g sodium hydroxide
15 g hydrogen peroxide (50% by weight in water)

| STRIKE BATH | |
|---|---|
| Silver, as KAg(CN)$_2$ | 1 g/L |
| Potassium Cyanide | 100 g/L |
| Potassium Carbonate | 15 g/L |
| PLATE BATH | |
| Silver, as KAg(CN)$_2$ | 30 g/L |
| Potassium Cyanide | 50 g/L |
| Potassium Carbonate | 15 g/L |

The Group 1A cyanide is present in the plating bath at a concentration range of 45 to 55%. Silver cyanide is present in the plating bath at a concentration range of 25 to 35%. The Group 1A carbonate is present in the plating bath in a concentration within the range of 10 to 20%

| Silver, as KAg(CN)$_2$ | 30 g/L |
|---|---|
| Potassium Cyanide | 50 g/L |
| Potassium Carbonate | 15 g/L |

The components of the surface activation bath are mixed and stirred slowly. The etch bath warms up by itself to about 50 degrees Celsius. Titanium is placed in the activation bath and etched for one hour. The surface of the metal at first becomes shiny but subsequently exhibits a dull grey finish. After this treatment the metal is placed immediately in a dilute strike bath at 100 mA/cm$^2$ for one minute. Then the metal is quickly dipped in the plating bath at 400 mA/cm$^2$ for ten minutes. The metal surface is rinsed with silver deionized water and wipe dried.

The silver metal film was mechanically stressed to test adherence. Whereas the acid-treated coating attached to the electroplated layer readily peeled off, the silver coating applied to the peroxide pretreated surface remained attached to the peroxide treated surface. The silver film was also placed in 50% KOH at 50 degrees Celsius for one month. Again no peeling was observed of the silver alkaline film formed on the peroxide pretreated surface.

One of the proposed uses of the metal coated titanium is as a case for a lightweight alkaline zinc battery. Depositing a conductive layer on the inside of the case eliminates the need for current collector screens or expanded metal. The outside of the case need not be insulated since titanium is a poor conductor of electricity and normally is covered with a layer of poorly conducting titanium oxide.

Referring now to FIGS. 1 and 2 a battery 10 has a case 12 formed of mating halves 14, 16 joined at the inner edges 18, 20 and sealed by a layer 22 of insulation such as a ceramic, an epoxy, or an injection moldable resin such as polyethylene or polypropylene. The inside surface 24, 26 of each half 14, 16 is coated with a layer 28, 30 of silver by the process of the invention. The silver layer 28, 30 protects the titanium surfaces 24, 26 from attack by the aqueous alkaline electrolyte present in the sheets 32 of regenerated cellulose separator present between the layer 34 of anode paste such as zinc/zinc oxide and the layer 36 of cathode paste such as Ag/Ag respectively, present on the silver layers 28, 30. Battery terminals 40, 42 are connected to the current collecting layers 38, 30.

It is to be realized that only preferred embodiments of the invention have been described and that numerous substitutions, modifications and alterations are permissible without departing from the spirit and scope of the invention as defined in the following claims.

What is claimed is:

1. An alkaline battery comprising:
   a case comprising a titanium container the inside surface being pre-coated with a peroxide-treated layer and a silver layer,
   said case enclosing:
      an alkaline electrolyte;
      an anode;
      a cathode; and
      separators to separate the anode and cathode.

2. An alkaline battery, according to claim 1 in which the inside pre-coated titanium surface;
   is formed by applying an aqueous alkaline solution of a peroxide to said surface; and
   reacting the titanium surface with the solution to form a rough, gray coating which will adhere strongly to said silver layer without separating from said titanium surface.

3. An alkaline battery according to claim 1 further comprising:
   a silver strike layer between the treated titanium surface and the silver layer.

\* \* \* \* \*